Feb. 21, 1967  G. F. M. CHAMPEL  3,305,175
APPARATUS FOR CONTROLLING THE TEMPERATURE OF A FLUID MEDIUM
Filed Aug. 14, 1964
*Fig. 1*
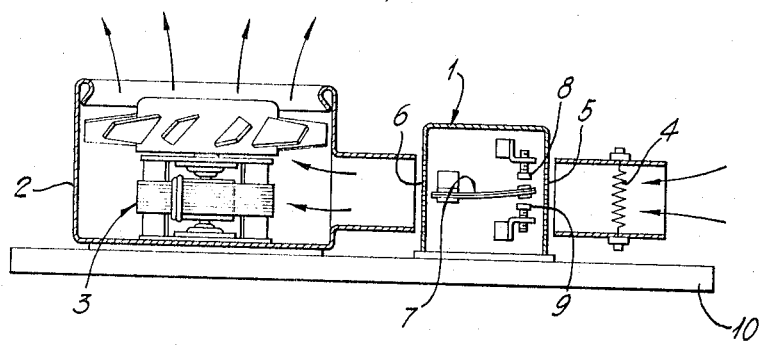
*Fig. 2*
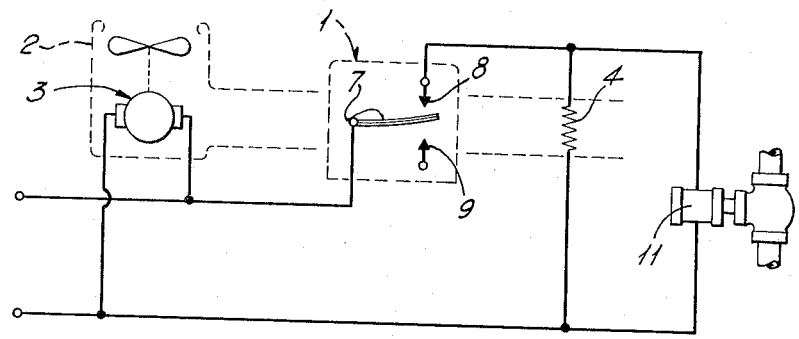
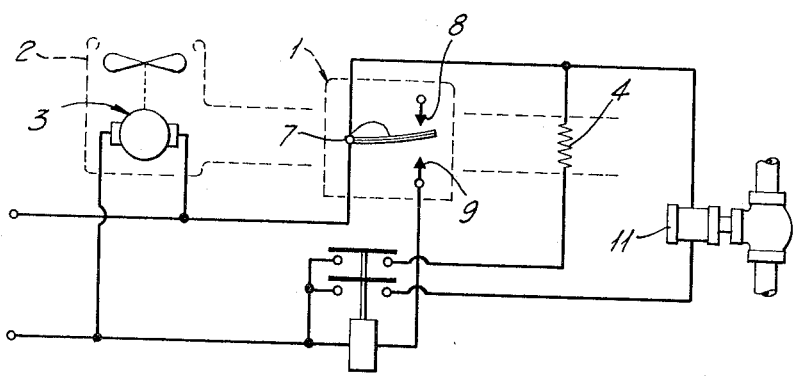
*Fig. 3*
INVENTOR
GERARD F. M. CHAMPEL
by
Mason, Kolehmainen, Rathburn and Wyss
ATTORNEYS.

3,305,175
APPARATUS FOR CONTROLLING THE TEMPERATURE OF A FLUID MEDIUM
Gerard F. M. Champel, 30 Rue de Sarda, Montelimar, France
Filed Aug. 14, 1964, Ser. No. 389,552
Claims priority, application France, Dec. 20, 1963, 958,038, Patent 1,377,875
1 Claim. (Cl. 236—68)

A first object of the invention is to reduce to a minimum the variation between the maximum and minimum temperatures of the environment in which a thermostat reacts.

A second object is to direct the gaseous environment onto a heating element and then to project this heated gas onto the sensitive element of the thermostat.

Another object is to impart to the thermostat a maximum sensitivity to increase the rapidity of its reaction to temperature variations.

Other objects and advantages will be revealed by the following description and drawings:

The characteristics of the invention arising out of the claims attached at the end of this description:

Devices according to the invention are shown in the attached drawings, in which:

FIGURE 1 is a diagrammatic sectional view of a device for regulating the temperature of a fluid medium in accordance with the invention.

FIGURE 2 shows diagrammatically the one embodiment of an electric circuit for use with the device of FIG. 1 in accordance with the invention.

FIGURE 3 shows diagrammatically another embodiment of an electrical circuit for use with the device of FIG .1, in accordance with the present invention.

The invention comprises fan means for moving the gaseous mass to be controlled, with constant and considerable speed over a heat sensitive bimetallic strip, after the gas has passed over an artificial heating source provided by an electrical resistance. The bimetallic strip is electrically connected with the heating source and is directly affected by the surrounding temperature, as is the resistance. It is thus not necessary to have an extremely high wattage resistance in order for the reaction of the bimetallic strip to be rapid and effective.

Nevertheless, if the resistance were of a high wattage type, the ventilation thereon would rapidly cool it and one would thus diminish the risk of obtaining false readings on the surrounding temperature.

The object of the invention is thus to increase the rapidity of action of an ordinary thermostat as well as those in which the sensitivity is accelerated by a heating resistance, in a manner so as to do away with periodical temperature variations which characterize the latter, and to reduce the variation between the demand and no-demand temperature limits that are present in ordinary thermostats because of their insufficient sensitivity to temperature variations.

Industrial utility of the invention is obvious for uses wherein materials must be maintained in constant temperature conditions; for example, numerous textile fibers, especially artificial fibers. In meteorology, the invention is useful where it is important to carry out measurements in an invariable temperature environment.

The construction of the apparatus according to the invention includes a thermostat housing 1 (shown in FIG. 1) having an inlet opening 5 and an outlet 6 in communication with a fan chamber 2 containing a motor driven fan 3 for moving the surrounding gases to be controlled through the thermostat housing. The gases pass first around a heating resistance 4 adjacent the inlet 5, and through the housing 1 which contains a heat sensitive bimetallic strip 7. Preferably, the fan housing 2 and thermostat housing 1 are mounted on a common base 10. The bimetallic strip 7 is movable between a contact 8 when the temperature is low, and a contact 9 when the temperature becomes excessive. When the strip 7 is moved to engage the contact 8, electric power is supplied to an electric valve 11, or the like, for admitting hot water or steam to a heating unit, and when the strip is out of engagement with the contact 8, the valve is not energized. The fan 3 is directly connected across the power lines to run continuously to bathe the strip in the gaseous atmosphere, the temperature of which is to be controlled. The heating resistance 4 is connected in parallel with the valve 11 and, hence, is only energized when the heat is turned on by the valve.

The invention is useful in maintaining a constant ambient temperature in a room and can be adjusted, for example, so that the strip 7 touches the contact 8 when the temperature drops to 20° C., and touches the contact 9 when the temperature rises to 21° C., these temperatures being those felt by the bimetallic strip 7.

The wattage of the resistance 4 and the fluid output flow of the fan 3 are selected so that the air in the room to be air-conditioned is heated by ½° C. before it passes on to the bimetallic strip 7 whenever there is a demand for heat; for example, when the strip reaches a temperature of 21° C., which corresponds to the end of the demand for heat, the temperature of the atmosphere in the room is 21° C. minus ½, or 21.5° C., and the strip moves away from the contact 8 toward the contact 9.

As soon as the demand for heat ceases, the bimetallic strip 7 is no longer heated by the resistance 4, and temperature in the housing 1 corresponds to the room temperature. The temperature of the room thus oscillates between 20° C. and 20.5° C. instead of 20° C. to 21° C., which is the sensitivity variation of the strip alone between the contacts 8 and 9.

We might also use a strip 7 having a sensitivity variation of 2° C.; for example, one that reacts between 20° C. and 22° C. By using a fan 3 and resistance 4 of selected values to heat the air 1.5° C. instead of ½° C., we could still obtain a sensitivity range of 20° C. to 20.5° C. instead of a 2° C. variation of the strip alone.

Thus the variation in sensitivity of the thermostatic strip 7 between 20° C. and 21° C. or a strip with a variation in sensitivity between 20° C. and 22° C. could, by adding the resisance 4 and the fan 3, be used to provide a variation in room temperature between 20° C. and 20.5° C.

Seeing that we can regulate at will this reduction of the variation by changing the wattage of the resistance 4, we may say that a thermostat with a selected sensitivity may be made adjustable for different variations until the variation is reduced to a selected minimum.

There is no need to reduce the strip variation beyond a selected minimum value, thanks to the instantaneousness of the reaction of the bimetallic strip, when subjected to the ventilation and artificial heating, and because of the ventilation and heating the wattages of the heated resistance can be reduced.

A feature of the invention is to move any gas whose temperature is required to be kept constant, around the sensitive element, or bimetallic strip of a thermostat, after having heated the gas to a given value and thereby increase the sensitivity of the strip at the desired moment in the cycle where it will be operating; the sensitivity being increased by artificial heating and the rapidity of action being obtained due to the fact of the continuous ventilation of the strip. Consequently, the forms and details of the invention can vary without affecting its principle.

Of course, the invention is not restricted to the example or embodiment described and shown above, in which the bimetallic strip can be replaced by any other sensitive element, without going outside of the scope of the invention for that purpose.

What I claim is:

Apparatus for controlling the temperature of a fluid medium by control of electrical energy from a power source comprising a heat sensitive, movable contact member electrically connected with said power source and movable in response to temperature changes in said fluid medium between a closed and open contact position with respect to a relatively fixed contact member, housing means for enclosing said contact members and formed with opening means therein permitting said fluid medium externally of said housing means to be moved therethrough around said contact members, electric fan means externally of said housing means for maintaining a continuous flow of said fluid medium around said contact members, through said housing means, electric heating means disposed in the flow path of said fluid medium into said housing means and connected between said contact members and said power source for heating said fluid medium flowing into said housing means when said contact members are in a selected one of said above mentioned positions, and heat supply control means including electrical load means connected between said contact members and said power source for activating said heat supply control when said contact members are in one of said above mentioned positions.

References Cited by the Examiner

UNITED STATES PATENTS

| | | | |
|---|---|---|---|
| 1,760,082 | 5/1930 | Parks | 236—68 X |
| 2,599,569 | 6/1952 | McLarty | 200—122 |
| 2,896,056 | 7/1959 | Borrup et al. | |

FOREIGN PATENTS

| | | |
|---|---|---|
| 788,793 | 8/1935 | France. |

ALDEN D. STEWART, *Primary Examiner.*